(12) United States Patent
Drzymala et al.

(10) Patent No.: US 11,048,897 B2
(45) Date of Patent: *Jun. 29, 2021

(54) FIELD-UPGRADABLE BARCODE READERS

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,409

(22) Filed: Jun. 22, 2020

(65) Prior Publication Data

US 2020/0320260 A1 Oct. 8, 2020

Related U.S. Application Data

(63) Continuation of application No. 16/167,159, filed on Oct. 22, 2018, now Pat. No. 10,691,905.

(51) Int. Cl.
*G06K 7/10* (2006.01)
*G06K 7/14* (2006.01)

(52) U.S. Cl.
CPC ..... *G06K 7/10722* (2013.01); *G06K 7/10831* (2013.01); *G06K 7/1413* (2013.01)

(58) Field of Classification Search
CPC .......... G06K 7/10722; G06K 7/10831; G06K 7/1413
See application file for complete search history.

(56) References Cited

U.S. PATENT DOCUMENTS

| 8,727,218 | B1 * | 5/2014 | Handshaw | ........... | G06K 7/1096 |
| | | | | | 235/440 |
| 9,275,263 | B2 * | 3/2016 | Drzymala | .............. | H05K 1/141 |
| 10,460,574 | B2 * | 10/2019 | Barkan | ................ | G06Q 20/206 |
| 10,691,905 | B2 * | 6/2020 | Drzymala | .......... | G06K 7/10722 |

* cited by examiner

*Primary Examiner* — Seung H Lee
(74) *Attorney, Agent, or Firm* — Yuri Astvatsaturov

(57) ABSTRACT

An example field-upgradeable barcode reader is configured to be supported by a workstation and includes a first housing portion supporting a generally horizontal platter having a generally horizontal window and a second housing portion supporting a generally vertical window. The second housing includes a receptacle configured to alternatively receive one of a cover and a field-installable imaging assembly insert. The field-installable imaging assembly insert is configured to receive an image acquisition assembly.

23 Claims, 14 Drawing Sheets

FIELD-UPGRADABLE BARCODE READERS

CROSS-REFERENCE TO RELATED APPLICATIONS

The present application is a continuation of U.S. patent application Ser. No. 16/167,159, now U.S. Pat. No. 10,691,905, filed on Oct. 22, 2018, and incorporated herein by reference in its entirety.

FIELD OF THE DISCLOSURE

The present patent relates generally to barcode readers and, in particular, relates to field-upgradable barcode readers.

BACKGROUND

Venues, such as retail stores, often use bi-optic barcode readers in the checkout process to read barcodes affixed to products being checked out. Bi-optic barcode readers are typically formed with a horizontal window and a vertical window arranged in a way that image data can be captured by internal imaging components (e.g., imaging sensors) through either of the two windows. While these bi-optic barcode readers are effective at reading barcodes, known barcode readers are unable to provide non-barcode imaging data that may be used to further monitor the checkout process.

Accordingly, there remains a demand for continued design improvements in the field of bi-optic barcode readers that address the need of providing non-barcode imaging data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
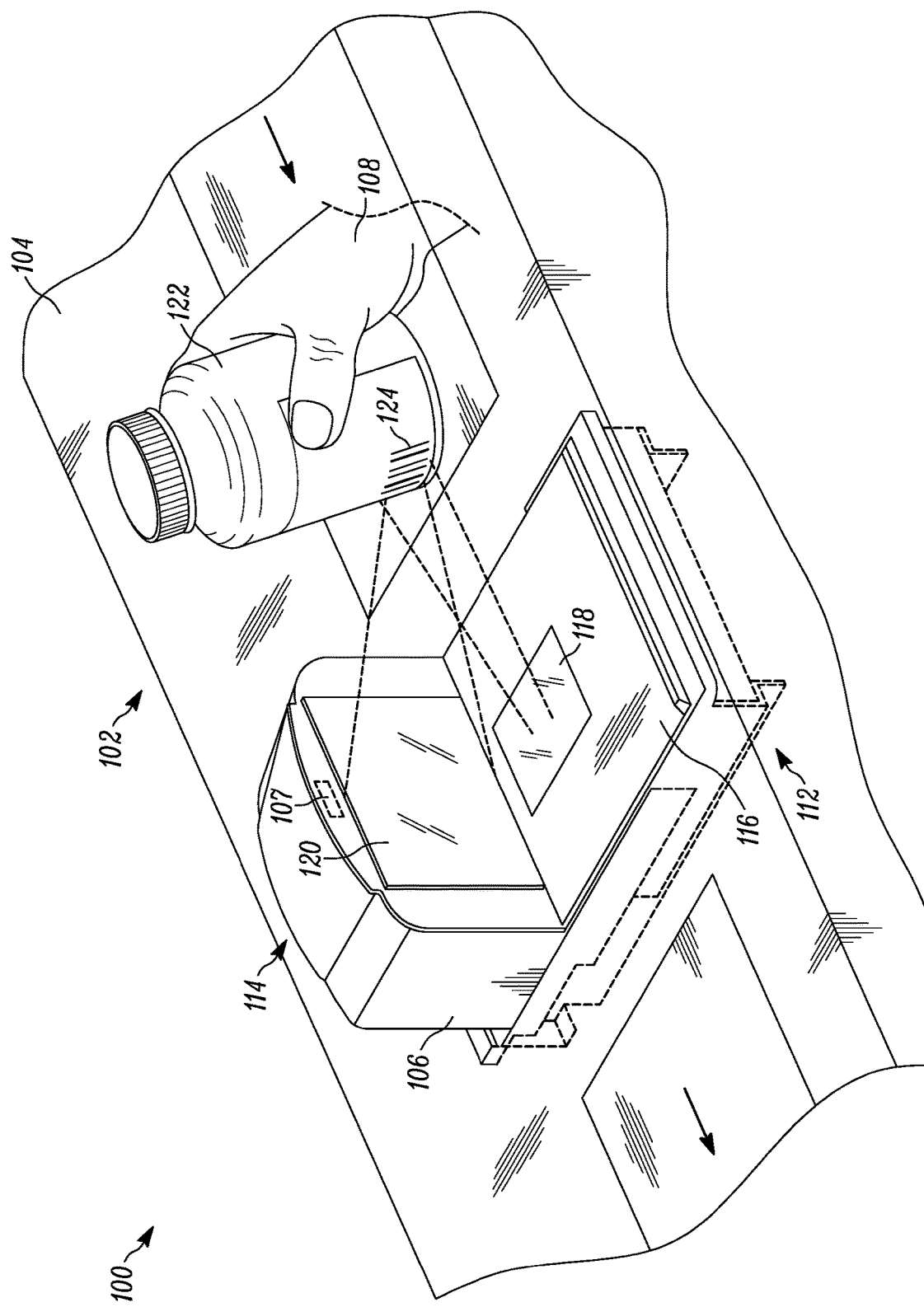
FIG. 1 illustrates a perspective view of an example checkout workstation in accordance with the teachings of this disclosure.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to scanners that can be field implemented with example cameras that are structured to obtain non-barcode data. The cameras may be implemented as color cameras. The scanners, sometimes referred to as barcode readers, have a generally horizontal platter including a horizontal window and a tower including a vertical window. Barcode image data can be obtained by barcode cameras through the horizontal window and the vertical window and non-barcode data can be obtained by at least one non-barcode camera through the vertical window. The non-barcode data may be used for different purposes such as, for example, building a product database and/or monitoring the checkout process at a retail store for fraudulent activity.

To enable the scanners to be field implemented with one of the color cameras, the scanner includes an example receptacle that is structured to receive different example inserts. The inserts are structured to carry a camera in a desired orientation and/or to carry a camera to provide a desired field of view. Depending on the additional and/or color camera used with the scanners and the configuration of that camera, the image data captured by the additional camera can have a field of view (FOV) of between about 30° and 135°. To provide such a relatively large FOV, in some examples, a "fish eye" lens can be used with the camera. The inserts may be referred to as adapters or field-installable imaging assembly inserts.

Using the inserts as disclosed herein, if a customer desires to position the camera in a first orientation or to achieve a first field of view, a first insert can be used. Alternatively, if the customer desires to position the camera in a second orientation or to achieve a second field of view, a second insert can be used. The first orientation may be a landscape or wide orientation and the second orientation may be a portrait or tall orientation. Put another way, the receptacle of the scanner is structured to fit a number of different inserts, each being associated with a different customer preference and/or requirement. Regardless of the orientation that the insert positions the non-barcode camera, the cameras may be angled at +/−45° relative to a horizontal plane. While the above example mentions the insert carrying one of the non-barcode cameras, the insert can alternatively be implemented as a plug or a cover that can be replaced if the customer chooses to change the configuration of the scanner to include an additional camera.

In a first example, a field-upgradeable barcode reader is configured to be supported by a workstation. The field-upgradeable barcode reader includes a first housing portion supporting a generally horizontal platter having a generally horizontal window. The field-upgradable bar code reader also includes a second housing portion supporting a generally vertical window. The second housing portion has a first cover removably attached thereto. The field-upgradeable barcode reader also includes an image capture arrangement having a first set of optical components and a second set of optical components.

The first set of optical components is positioned at least partially within the first housing portion. The first set of optical components is configured to produce and direct a first field of view (FOV) through the generally horizontal window. The second set of optical components includes a first fold mirror and a second fold mirror. Each of the first fold mirror and the second fold mirror is positioned at least partially within the second housing portion. The second set of optical components is configured to produce and direct a second FOV and a third FOV through the generally vertical window such that the first fold mirror redirects the second FOV through the generally vertical window and the second fold mirror redirects the third FOV through the generally vertical window. The second housing includes a receptacle configured to alternatively receive one of a second cover and a field-installable imaging assembly insert. The field-installable imaging assembly insert is configured to receive an image acquisition assembly. The receptacle is positioned between the first fold mirror and the second fold mirror.

In a second example, a field-upgradeable barcode reader is configured to be supported by a workstation. The field-upgradeable barcode reader includes a first housing portion supporting a generally horizontal platter having a generally horizontal window. The field-upgradable barcode reader also includes a second housing portion supporting a generally vertical window. The second housing includes a receptacle configured to alternatively receive one of a cover and a field-installable imaging assembly insert. The field-installable imaging assembly insert is configured to receive an image acquisition assembly.

In a variation of the second example, the field-upgradeable barcode reader includes an image capture arrangement having a first set of optical components and a second set of optical components. In a further variation of the second example, the first set of optical components is positioned at least partially within the first housing portion. The first set of optical components is configured to produce and direct a first field of view (FOV) through the generally horizontal window. The second set of optical components includes a first fold mirror and a second fold mirror. The first fold mirror and the second fold mirror are positioned at least partially within the second housing portion. The second set of optical components is configured to produce and direct a second FOV and a third FOV through the generally vertical window such that the first fold mirror redirects the second FOV through the generally vertical window and the second fold mirror redirects the third FOV through the generally vertical window.

In a third example, a barcode reader includes a housing carrying first and second imager assemblies. The first and second imager assemblies are to obtain barcode data. The housing defines a receptacle to removably receive any one of: 1) a cover; 2) a first insert to carry a first camera; or 3) a second insert to carry the first camera or a second camera. The first insert is to enable the first camera to be positioned in a first orientation. The second insert is to enable the first camera or the second camera to be positioned in a second orientation.

In a variation of the third example, the barcode reader includes a first window and a second window. The first imager assembly is to capture first barcode data of the barcode data through the first window and the second imager assembly is to capture second barcode data of the barcode data through the second window. In a further variation of the third example, the first imager assembly includes a first image sensor and first optical components to provide the first image sensor with a first field of view through the first window and the second imager assembly includes a second image sensor and second optical components to provide the second image sensor with a second field of view and a third field of view through the second window.

In a fourth example, a barcode reader includes a housing carrying first and second imager assemblies to obtain barcode data. The barcode reader also includes a camera to be disposed in the housing. The camera is different from the first and second imager assemblies. The barcode reader also includes an assembly configured to enable an orientation of the camera to change between a first orientation and a second orientation.

In a variation of the fourth example, the assembly includes a receptacle of the housing that is configured to alternatively receive one of a first field-installable insert or a second field-installable insert. The first field-installable insert is to carry the camera when the first field-installable insert is received by the receptacle and the second field-installable insert is to carry the camera when the second field-installable insert is received by the receptacle.

Referring now to the drawings, FIG. 1 illustrates a perspective view of a point-of-sale (POS) system 100 having a workstation 102 with a counter 104, a bi-optical (also referred to as "bi-optic") barcode reader 106 and an additional camera 107 at least partially positioned within the workstation 102. The camera 107 may be referred to as an image acquisition assembly and may be implemented as a color camera or a camera that is configured to obtain non-barcode data. The POS system 100 is often managed by a store employee such as a clerk 108. However, in other cases the POS system 100 may be a part of a so-called self-checkout lane where instead of a clerk, a customer is responsible for checking out his or her own products.

The barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some embodiments, the top portion 116 may include a removable or a non-removable platter (e.g., a weighing platter). The top portion 116 can also be viewed as being positioned substantially parallel with the counter 104 surface. As set forth herein, the phrase "substantially parallel" means+/−10° of parallel and/or accounts for manufacturing tolerances. It's worth noting that while, in FIG. 1, the counter 104 and the top portion 116 are illustrated as being about co-planar, that does not have to be the case for the platter and the counter 104 to be considered substantially parallel. In some instances, the counter 104 may be raised or lowered relative to the top surface of the top portion 116, where the top portion 116 is still viewed as being positioned substantially parallel with the counter 104 surface. The raised housing 114 is configured to extend above the top portion 116 and includes a second optically transmissive window 120 positioned in a generally upright plane relative to the top portion 116 and/or the first optically transmissive window 118. Note that references to "upright" include, but are not limited to, vertical. Thus, as an example, something that is upright may deviate from a vertical axis/plane by as much as 45 degrees.

In practice, a product 122, such as for example a bottle, is swiped past the barcode reader 106 such that a barcode 124 associated with the product 122 is digitally read through at least one of the first and second optically transmissive windows 118, 120. This is particularly done by positioning the product 122 within the fields of view (FsOV) of the digital imaging sensor(s) housed inside the barcode reader 106. Additionally, as the product 122 is swiped past the barcode reader 106, the camera 107 obtains image data of the product 122. The image data obtained by the camera 107 may have different uses. For example, the image data can be processed to verify that the product 122 scanned matches the barcode 124 and/or image data can be used to populate a database.

Figure 2:
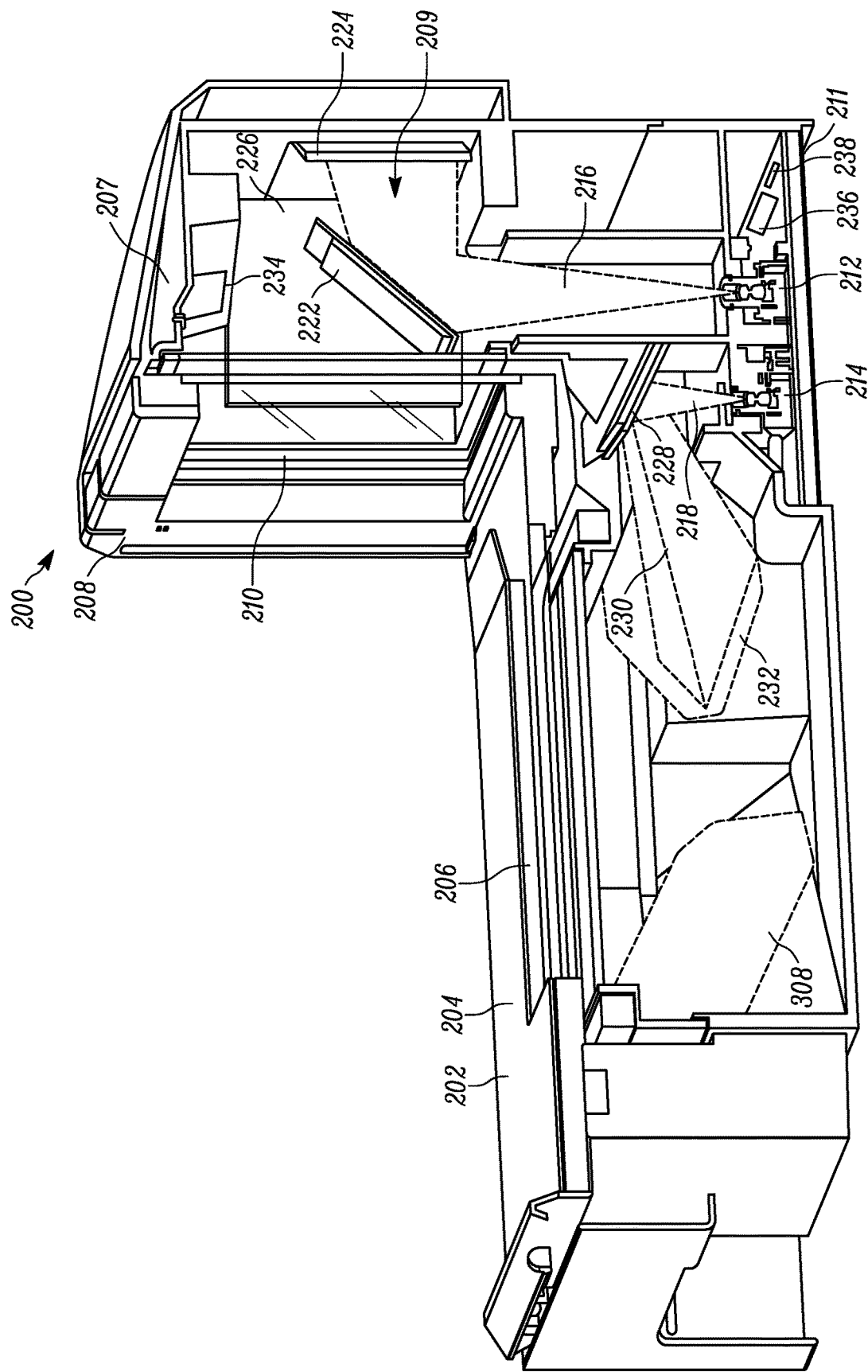
FIG. 2 illustrates a perspective view of an example barcode reader that can be used to implement the barcode reader of the checkout workstation of FIG. 1.

FIG. 2 illustrates a cross-sectional perspective view of an example barcode reader 200 that can be used to implement the barcode reader 106 of FIG. 1. As shown, the barcode reader 200 includes an example first housing portion 202 that supports a generally horizontal platter 204 having a first window 206. The first window 206 may be implemented as an optically transmissive window and may be referred to as a generally horizontal window. The barcode reader 200 is also shown including an example second housing portion 208 that supports a second window 210. The second housing portion 208 may be referred to as a tower and the second window 210 may be referred to as a generally vertical window. The second window 210 may be implemented as an optically transmissive window. As shown, the first window 206 is substantially perpendicular relative to the second window 210. As set forth herein, the phrase "substantially perpendicular" means+/−10° of perpendicular and/or accounts for manufacturing tolerances.

To enable imaging data to be obtained by the barcode reader 200, the barcode reader 200 includes a printed circuit board (PCB) 211 with a first imaging assembly 212 and a second imaging assembly 214. The imaging assemblies 212, 214 may be referred to as cameras or imager assemblies. Each of the imaging assemblies 212, 214 includes an imaging sensor having a plurality of photosensitive elements that define a substantially flat surface along with other components such as a housing and lens(es) for capturing image data for a FOV. The arrangement and configuration of the components including the imaging sensor, the photosensitive elements, the housing, the lens(es) define a specific FOV for each of the imaging assemblies 212, 214. As shown, the first imaging assembly 212 and its imaging sensor are configured to capture image data over a first field of view (FOV) 216 and the second imaging assembly 214 and its imaging sensor are configured to capture image data over a second field of view (FOV) 218. The image data captured by the first and second imaging assemblies 212, 214 may include barcode data.

Figure 3:
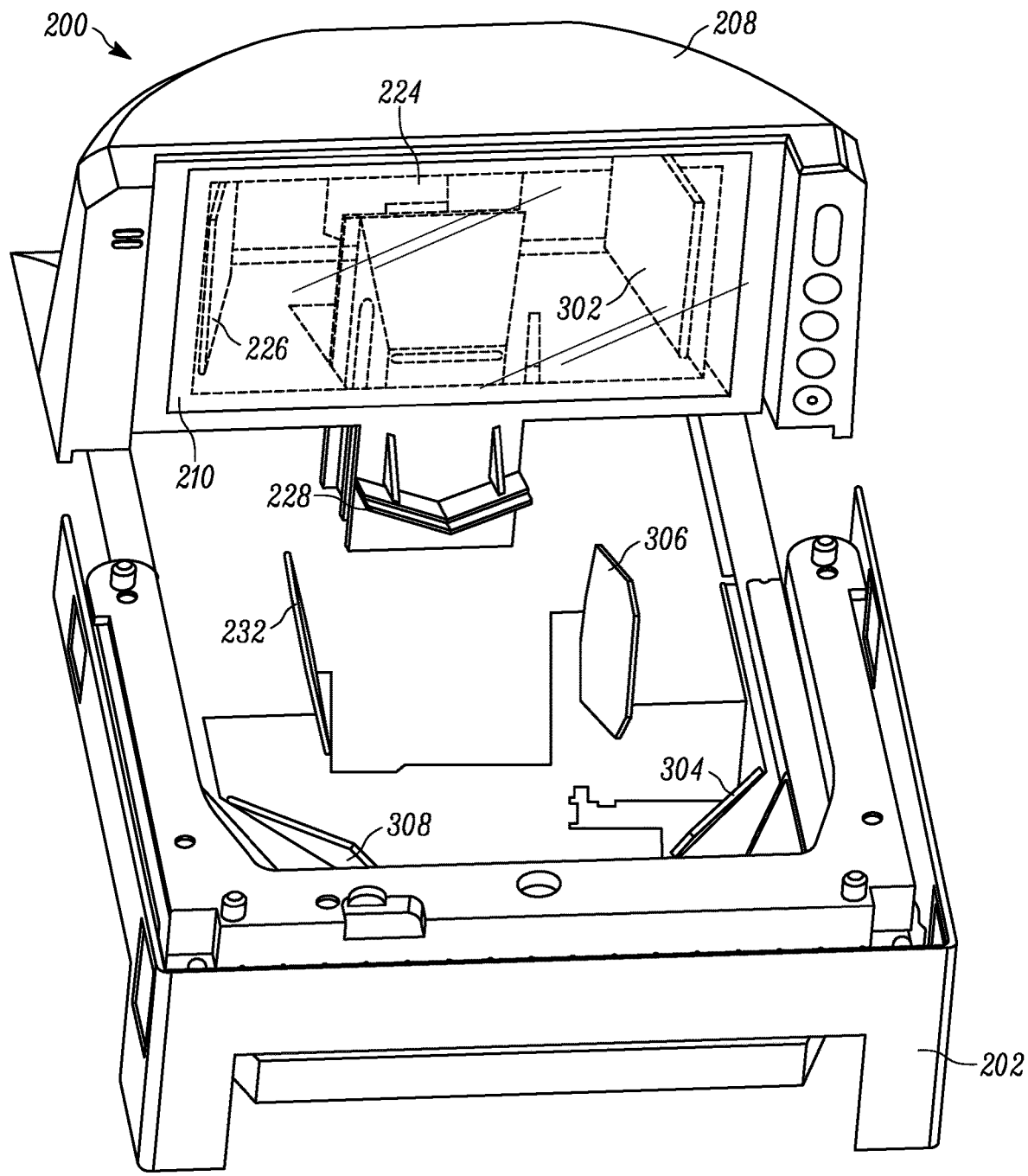
FIG. 3 illustrates a partial interior perspective view of the barcode reader of FIG. 2.
Figure 4:
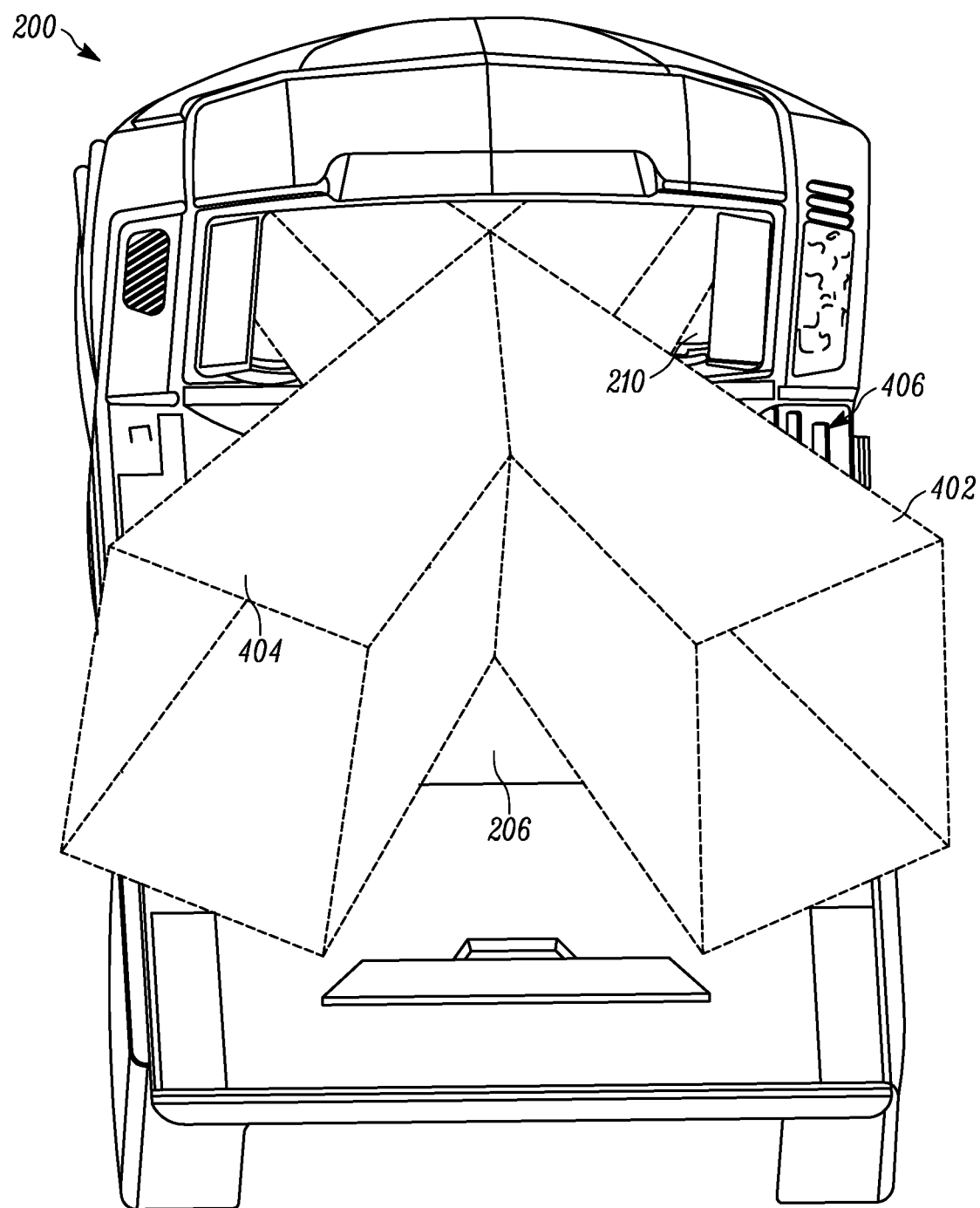
FIG. 4 illustrates example first and second sub fields of view projecting from a generally vertical window of the barcode reader of FIG. 2.

Referring to FIGS. 2-5 and to alter and redirect the first FOV 216 to achieve desired functionality, the barcode reader 200 includes a first fold mirror 222 positioned to redirect the first FOV 216 toward a first splitter mirror 224. The first splitter mirror 224 is structured and positioned to split the first FOV 216 into a first sub FOV 402 (FIG. 4) and a second sub FOV 404 (FIG. 4). The first sub FOV 402 is directed toward a second fold mirror 226 and the second sub FOV 404 is directed toward a third fold mirror 302 (FIG. 3). The second fold mirror 226 redirects the first sub FOV 402 out of the second window 210 as shown in FIG. 4 and the third fold mirror 302 redirects the second sub FOV 404 out of the second window 210 as shown in FIG. 4. In the illustrated example, the first imaging assembly 212 is configured to produce the first FOV 216 and the mirrors 222, 224, 226, 302 are at least partially positioned in the second housing portion 208 to direct the first and second sub FsOV 402, 404 through the second window 210 as shown in FIG. 4. Put another way, the mirrors 222, 224, 226, 302 and the first imaging assembly 212 are configured to capture barcode data through the second window 210. The mirrors 226, 302 and/or the first imaging assembly 212 may be referred to as optical components.

Figure 5:
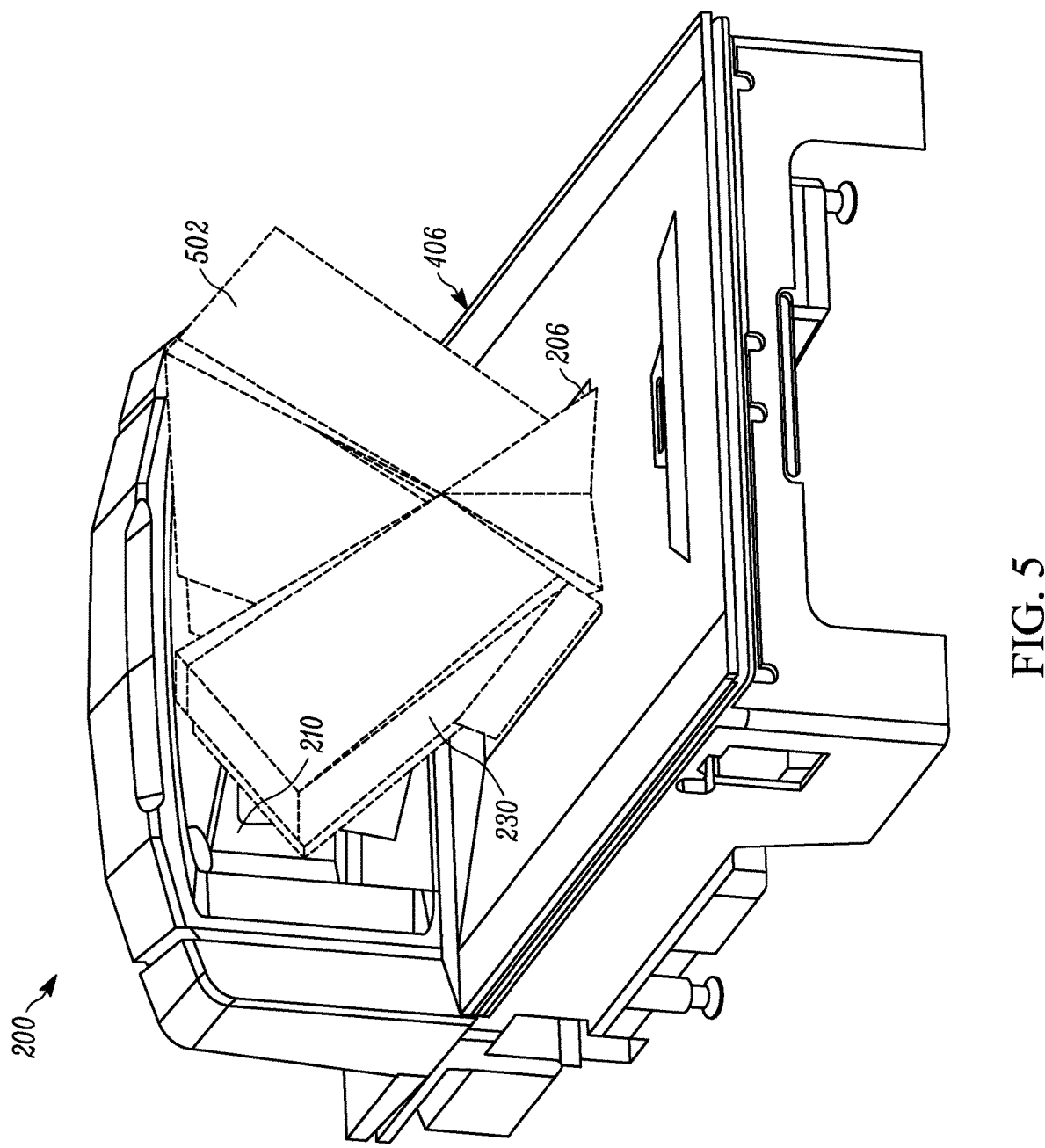
FIG. 5 illustrates example third and fourth sub fields of view projecting from a generally horizontal window of the barcode reader of FIG. 2.

Similarly, to alter and redirect the second FOV 218, the barcode reader 200 includes a second splitter mirror 228. The second splitter mirror 228 is structured and positioned to split the second FOV 218 into a third sub field of view 230 and a fourth sub FOV 502 (FIG. 5). The third sub FOV 230 is directed toward a third fold mirror 232 which directs the third sub FOV 230 to a fourth fold mirror 304 (FIG. 3). The fourth fold mirror 304 is structured and positioned to redirect the third sub FOV 230 out of the first window 206 as shown in FIG. 5. The fourth sub FOV 502 is directed toward a fifth fold mirror 306 (FIG. 3) which directs the fourth sub FOV 502 to a sixth fold mirror 308 (FIG. 3). The sixth fold mirror 308 redirects the fourth sub FOV 502 out of the first window 206 as shown in FIG. 5. In the illustrated example, the second imaging assembly 214 is configured to produce the second FOV 218 and the mirrors 232, 304, 306, 308 are at least partially positioned in the first housing portion 202 to direct the third and fourth sub FsOV 230, 502 through the first window 206. Put another way, the mirrors 228, 232, 304, 306, 308 and the second imaging assembly 214 are configured to capture barcode data through the first window 206. The mirrors 232, 304, 306, 308 and/or the second imaging assembly 214 may be referred to as optical components. The mirrors 222, 224, 226, 232, 302, 232, 304, 306, 308 and the first and second imaging assemblies 212, 214 may be referred to as an image capture arrangement. While the mirrors 222, 224, 226, 232, 302, 304, 306, 308 are shown in a particular arrangement, the precise angle and position of the mirrors 222, 224, 226, 232, 302, 304, 306, 308 can be varied to achieve a desired FOV path direction.

To enable the barcode reader 200 to carry the camera 107, a divider 207 of the second housing portion 208 defines an example receptacle 234. The receptacle is shown positioned between the fold mirrors 226, 302 and may be referred to as an aperture or an opening. In addition to defining the receptacle 234, the divider 207 defines a cavity 209 in which the mirrors 222, 223, 224, 302 and/or the first imaging assembly 212 are at least partially positioned.

Figure 6:
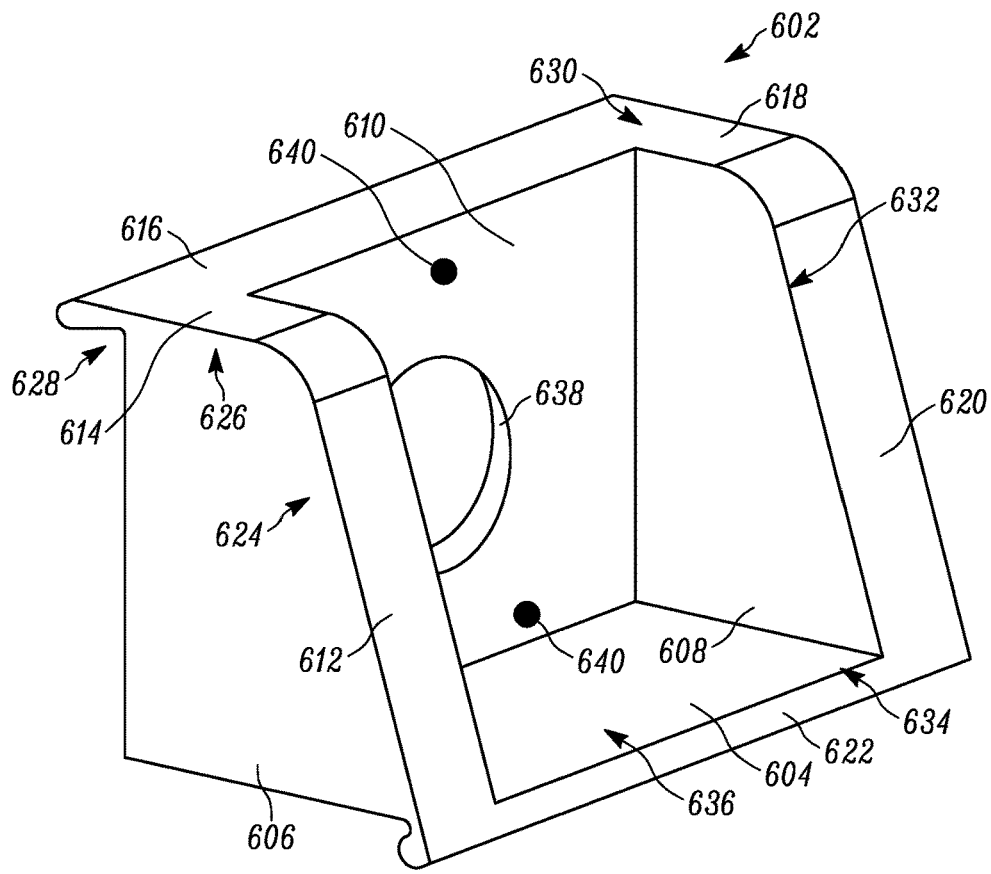
FIG. 6 illustrates a perspective view of an example insert that is structured to be received within an example receptacle of the barcode reader of FIG. 2 and is structured to carry a camera in a landscape orientation.
Figure 7:
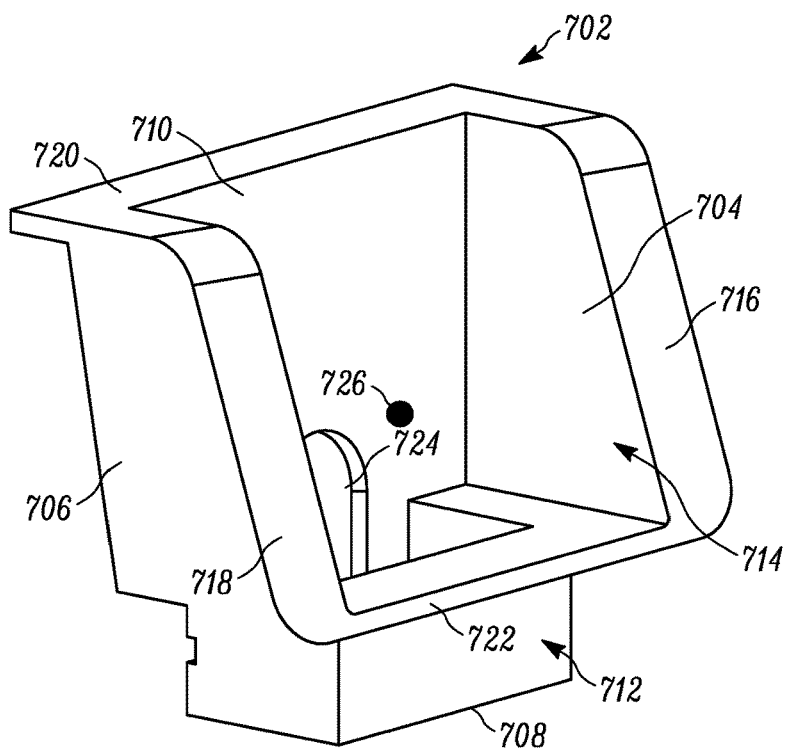
FIG. 7 illustrates a perspective view of another example insert that is structured to be received within the receptacle of the barcode reader of FIG. 2 and is structured to carry a camera in a portrait orientation.
Figure 8:
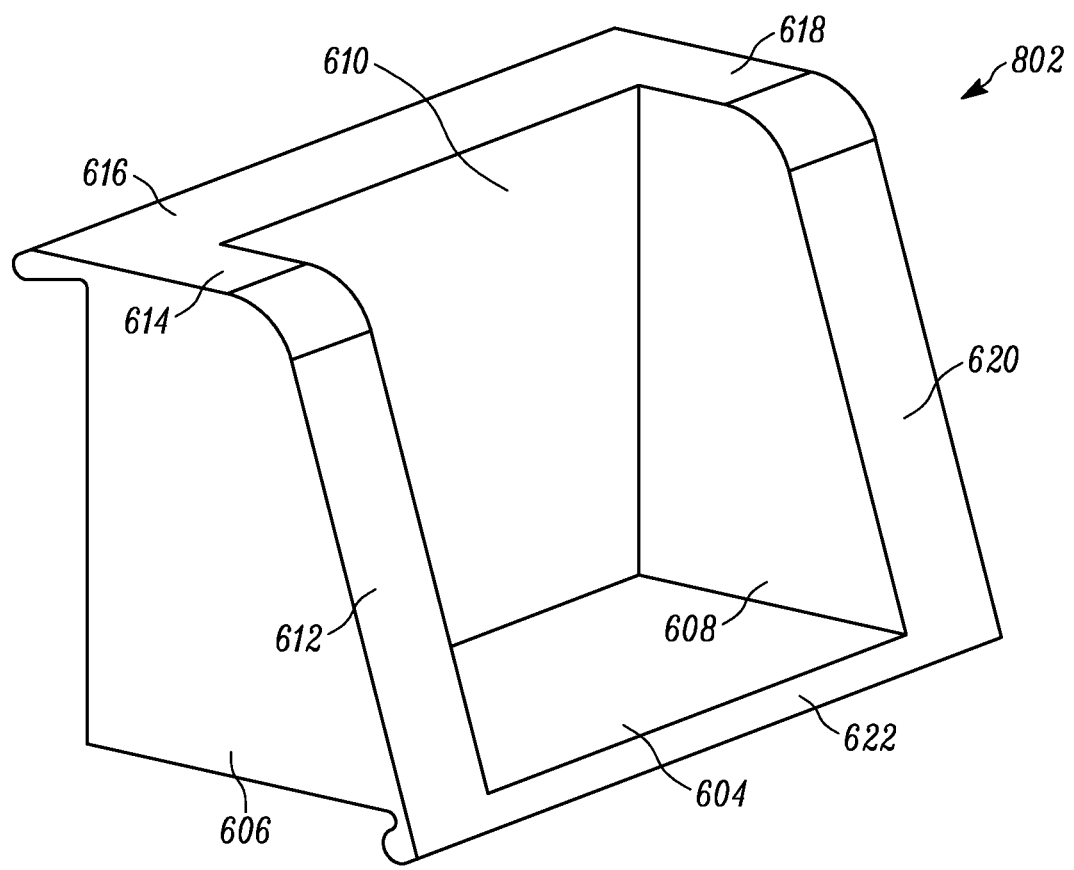
FIG. 8 illustrates a perspective view of another example insert that is structured to be received within the receptacle of the barcode reader of FIG. 2 and is structured to cover the receptacle when the barcode reader is not implemented with an additional camera.

In the illustrated example, the receptacle 234 is structured to accept different inserts such as, for example, a first insert 602 shown in FIG. 6, a second insert 702 shown in FIG. 7 and a third insert 802 shown in FIG. 8. The first insert 602 is structured to carry the camera 107 in a landscape or first orientation, the second insert 702 is structured to carry the camera 107 in a portrait or second orientation and the third insert 802 is structured to cover the receptacle 234 when the barcode reader 200 is not implemented with the camera 107 or, more generally, prior to the barcode reader 200 being field upgraded with the camera 107. Regardless of how the inserts 602, 702 are configured, the barcode reader 200 is structured to carry the camera 107 when the inserts 602, 702 are received by the receptacle 234 to enable additional image data to be obtained and accessed by the PCB 211. Alternatively, the barcode reader 200 may include an additional PCB to which the camera 107 is coupled when the barcode reader 200 is implemented with the camera 107. The additional image data may include non-barcode data or color image data.

To enable image data acquired by the imaging assemblies 212, 214 and the camera 107 to be detected and/or decoded, the PCB 211 includes an example decode assembly 236. In operation, the data acquired by the imaging assemblies 212, 214 is transmitted or otherwise accessed by the decode assembly 236, where the data is processed and/or analyzed in an effort to detect and decode a valid barcode(s), for example. In some examples, components such as a controller for controlling the imaging assemblies 212, 214, the camera 107 and/or the decode assembly 236 can be installed on the PCB 211. Additionally, components like a controller for controlling the imaging assemblies, the illumination assemblies and/or the decode assembly can also be installed on the PCB 211 to detect non-barcode data from the camera 107 including the identification of the product 122 being scanned, for example. Alternatively, such a controller may be positioned separate from the PCB. Signal data may be sent to/from the PCB 211 via interface connectors 238.

FIG. 3 illustrates a partial interior perspective view of the barcode reader 200 of FIG. 2. As shown, the first splitter mirror 224 is arranged to split the first FOV 216 into the first sub FOV 402 directed toward the second fold mirror 226 and the second sub FOV 404 directed toward the third fold mirror 302. The second and third fold mirrors 226, 302 are illustrated being positioned to direct the first and second sub FsOV 402, 404 out of the second window 210.

As also shown, the second splitter mirror 228 is arranged to split the second FOV 218 into the third sub FOV 230 directed toward the third fold mirror 232 and the fourth sub FOV 502 directed toward the fifth fold mirror 306. To direct the third and fourth sub FsOV 230, 502 out of the first window 206 or, more generally, out of the barcode reader 200, the third fold mirror 232 is shown positioned to direct the third sub FOV 230 to the fourth fold mirror 304 which directs the third sub FOV 230 out of the first window 206 and the fifth fold mirror 306 is shown positioned to direct the fourth sub FOV 502 to the sixth fold mirror 308 which directs the fourth sub FOV 502 out of the first window 206.

FIG. 4 illustrates the first and second sub FsOV 402, 404 projecting from the second window 210 of the barcode reader 200 of FIG. 2. In the currently described embodiment, the fold mirrors 226, 302 are positioned such that the first sub-FOV 402 and the second sub-FOV 404 intersect above the first window 206 and in a product-scanning region 406 of the barcode reader 200. The product-scanning region 406 is the general area where the product 122 is expected to be presented for image capture by the barcode reader 200. In some cases, the fold mirrors 226, 302 can be arranged to cause the first sub-FOV 402 and the second sub-FOV 404 to intersect partially. In other instances, the fold mirrors 226, 302 can be arranged to cause the first sub-FOV 402 and the second sub-FOV 404 to intersect fully. In still other instances, the fold mirrors 226, 302 can be arranged to cause a centroidal axis of each of the first sub-FOV 402 and the second sub-FOV 404 to intersect with or without regard for the cross-sectional dimensions of the FsOV.

FIG. 5 illustrates the third and fourth sub FsOV 230, 502 projecting from the first window 206 of the barcode reader 200 of FIG. 2. In the currently described embodiment, the fold mirrors 232, 304, 306, 308 are positioned such that the third sub FOV 230 and the fourth sub FOV 502 intersect in front of the second window 210 and in the product-scanning region 406 of the barcode reader 200. In some cases, the fold mirrors 232, 304, 306, 308 can be arranged to cause the third sub FOV 230 and the fourth sub FOV 502 to intersect partially. In other instances, the fold mirrors 232, 304, 306, 308 can be arranged to cause the first sub-FOV 402 and the second sub-FOV 404 to intersect fully. In still other instances, the fold mirrors 226, 302 can be arranged to cause a centroidal axis of each of the first sub-FOV 402 and the second sub-FOV 404 to intersect with or without regard for the cross-sectional dimensions of the FsOV.

FIG. 6 illustrates a perspective view of the example insert 602 that is structured to be received within the receptacle 234 of the barcode reader 200. As shown, the insert 602 includes a bottom wall 604 from which side walls 606, 608 and a front wall 610 extend. As also shown, lips 612, 614, 616, 618, 620, 622 extend from edges 624, 626, 628, 630, 632, 634 of the walls 604, 606, 608, 610. The lips 612, 614, 616, 618, 620, 622 are structured to engage surfaces of the divider 207 that define the receptacle 234. The interaction between the lips 612, 614, 616, 618, 620, 622 and the surfaces of the divider 207 retains the insert 602 within the receptacle 234. When the camera 107 is received within a cavity 636 of the insert 602 to position the camera 107 in a landscape orientation and to enable image data to be obtained by the camera 107, a lens of the camera 107 aligns with a central aperture 638 of the insert 602. To retain the camera 107 within the insert 602, the front wall 610 defines apertures 640 that are structured to receive protrusions of the camera 107. However, in other examples, the camera 107 may be retained within or relative to the insert 602 in any other suitable way.

FIG. 7 illustrates a perspective view of the example insert 702 that is structured to be received within the receptacle 234 of the barcode reader 200. As shown, the insert 702 includes side walls 704, 706, a bottom wall 708 and front and rear walls 710, 712 that define a cavity 714. The cavity 714 is sized and structured to receive the camera 107 in a portrait orientation. Thus, a comparison between the insert 702 of FIG. 7 and the insert 602 of FIG. 6 shows that the width of the insert 702 of FIG. 7 is less than the width of the insert 602 of FIG. 6 enabling the insert 702 of FIG. 7 to carry the camera 107 in the portrait orientation and enabling the insert 602 of FIG. 6 to carry the camera 107 in the landscape orientation. The insert 702 includes lips 716, 718, 720, 722 extending from the respective walls 704, 706, 710, 712 that are structured to engage the surfaces of the divider 207 that define the receptacle 234 to retain the insert 702 within the receptacle 234

When the camera 107 is received within the cavity 714 to position the camera 107 in a portrait orientation and to enable image data to be obtained by the camera 107, a lens of the camera 107 aligns with a central aperture 724 of the insert 702. To retain the camera 107 within the insert 702, the front wall 710 defines apertures 726 that are structured to receive protrusions of the camera 107. However, in other examples, the camera 107 may be retained within or relative to the insert 702 in any other suitable way.

FIG. 8 illustrates a perspective view of the example insert 802 that is structured to be received within the receptacle 234 of the barcode reader 200. The insert 802 is similar to the insert 602 of FIG. 6, but does not include the central aperture 638 and does not include the apertures 640. As such, the insert 802 of FIG. 8 is structured as a cover that covers the receptacle 234 when the barcode reader 200 is not implemented with the camera 107, for example. When the barcode reader 200 is initially implemented with the insert 802 and then upgraded to carry the camera 107 by replacing the insert 802 of FIG. 8 with one of the insert 602 of FIG. 6 or the insert 702 of FIG. 7, the barcode reader 200 is said to have been "upgraded" or "field upgraded."

Figure 9:
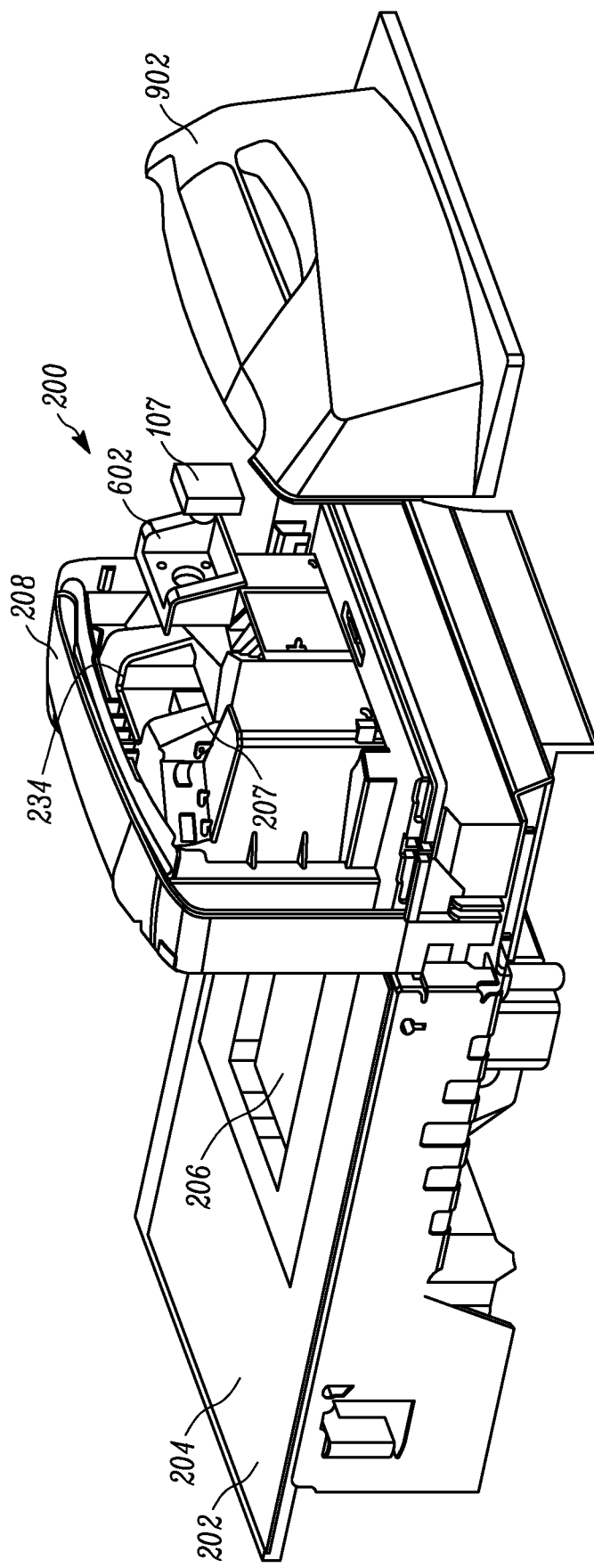
FIG. 9 illustrates an expanded rear perspective view of the barcode reader of FIG. 2 including the insert of FIG. 6 that shows an example rear cover of the barcode reader detached from a housing portion of the barcode reader.

FIG. 9 illustrates an expanded rear perspective view of the barcode reader 200 illustrating an example rear cover 902 detached from the second housing portion 208. FIG. 9 also illustrates the contours of the divider 207 that correspond to contours of the insert 602 to enable the insert 602 to be matingly received by the receptacle 234. When the rear cover 902 is removed from the second portion 208, the insert 602 and the receptacle 234 can be easily accessed to provide the barcode reader 200 with the camera 107, for example. When the rear cover 902 is coupled to the second housing portion 208, the rear cover 902 covers the receptacle 234.

Figure 10:
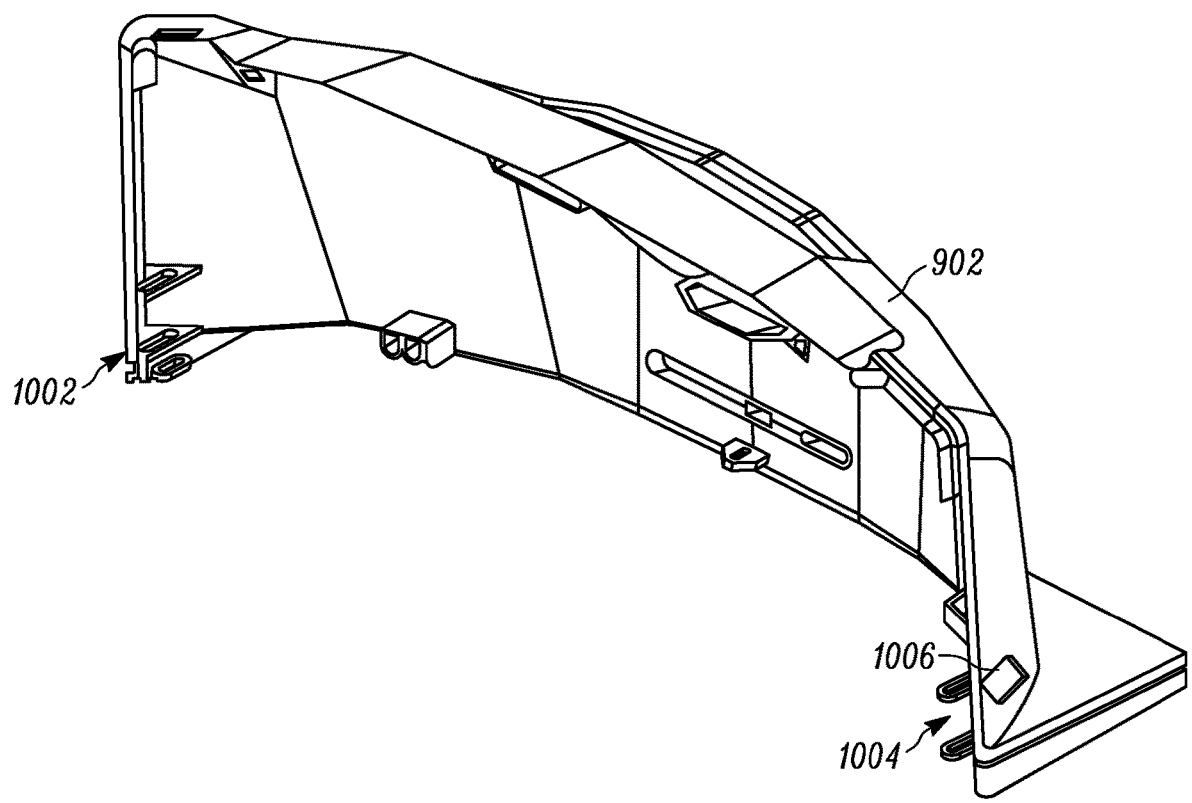
FIG. 10 illustrates a perspective view of the rear cover of the barcode reader of FIG. 9.

FIG. 10 illustrates a perspective view of the rear cover 902. As shown, the rear cover 902 includes fasteners 1002, 1004 that are structured to couple with corresponding structures of the second housing portion 208 to enable the rear cover 902 to be removably coupled to the second housing portion 208. The fasteners 1002, 1004 can be implemented as snap-fit connections. To enable the rear cover 902 to be uncoupled from the second housing portion 208, the rear cover 902 of the illustrated example includes an example release 1006. The release 1006 may be implemented as a button that causes the fasteners 1002, 1004 to release the second housing portions 208 to enable the rear cover 902 to be removed from the second housing portion 208. The release 1006 may alternatively be implemented on the second housing portion 208.

Figure 11:
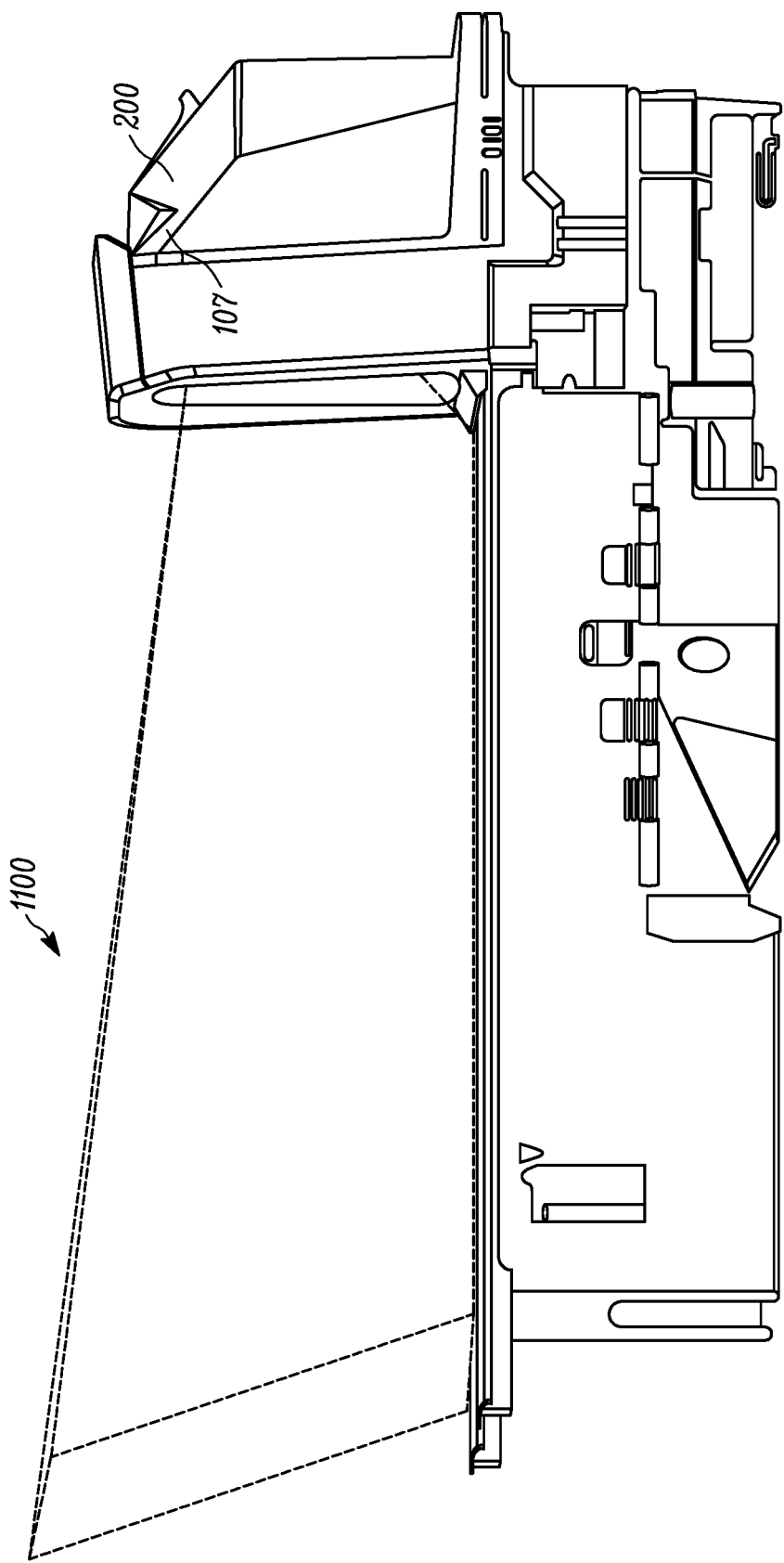
FIG. 11 illustrates an example vertical field of view of the barcode reader of FIG. 2 when the barcode reader is implemented with the insert of FIG. 6.

FIG. 11 illustrates a side view of the barcode reader 200 showing an example vertical field of view 1100 of the camera 107 when the barcode reader 200 is implemented with the insert 602 of FIG. 6. The insert 602 carries the camera 107 in the landscape orientation. As shown, the vertical field of view 1100 is approximately 53°. However, depending on the configuration of the camera 107, the vertical field of view 1100 can be different (e.g., between 45° and 100°).

Figure 12:
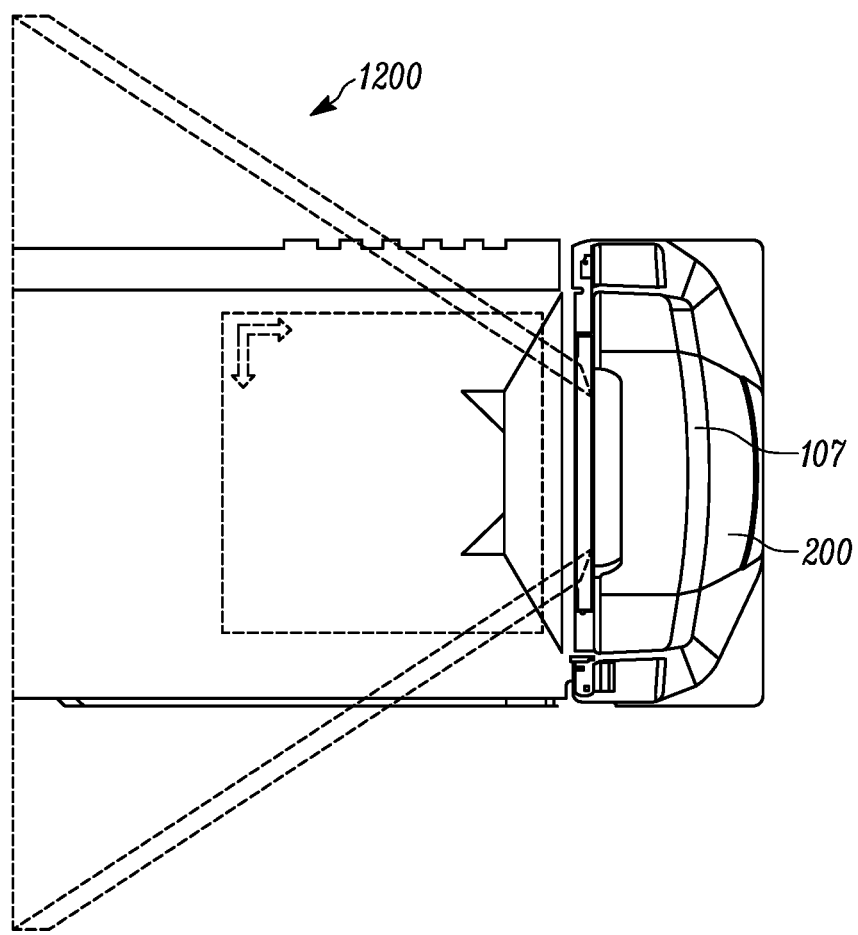
FIG. 12 illustrates an example horizontal field of view of the barcode reader of FIG. 2 when the barcode reader is implemented with the insert of FIG. 6.

FIG. 12 illustrates a top plan view of the barcode reader 200 showing an example horizontal field of view 1200 of the camera 107 when the barcode reader 200 is implemented with the insert 602. The insert 602 carries the camera 107 in the landscape orientation. As shown, the horizontal field of view 1200 is approximately 70°. However, depending on the configuration of the camera 107, the horizontal field of view 1200 can be different (e.g., between 30° and 135°).

Figure 13:
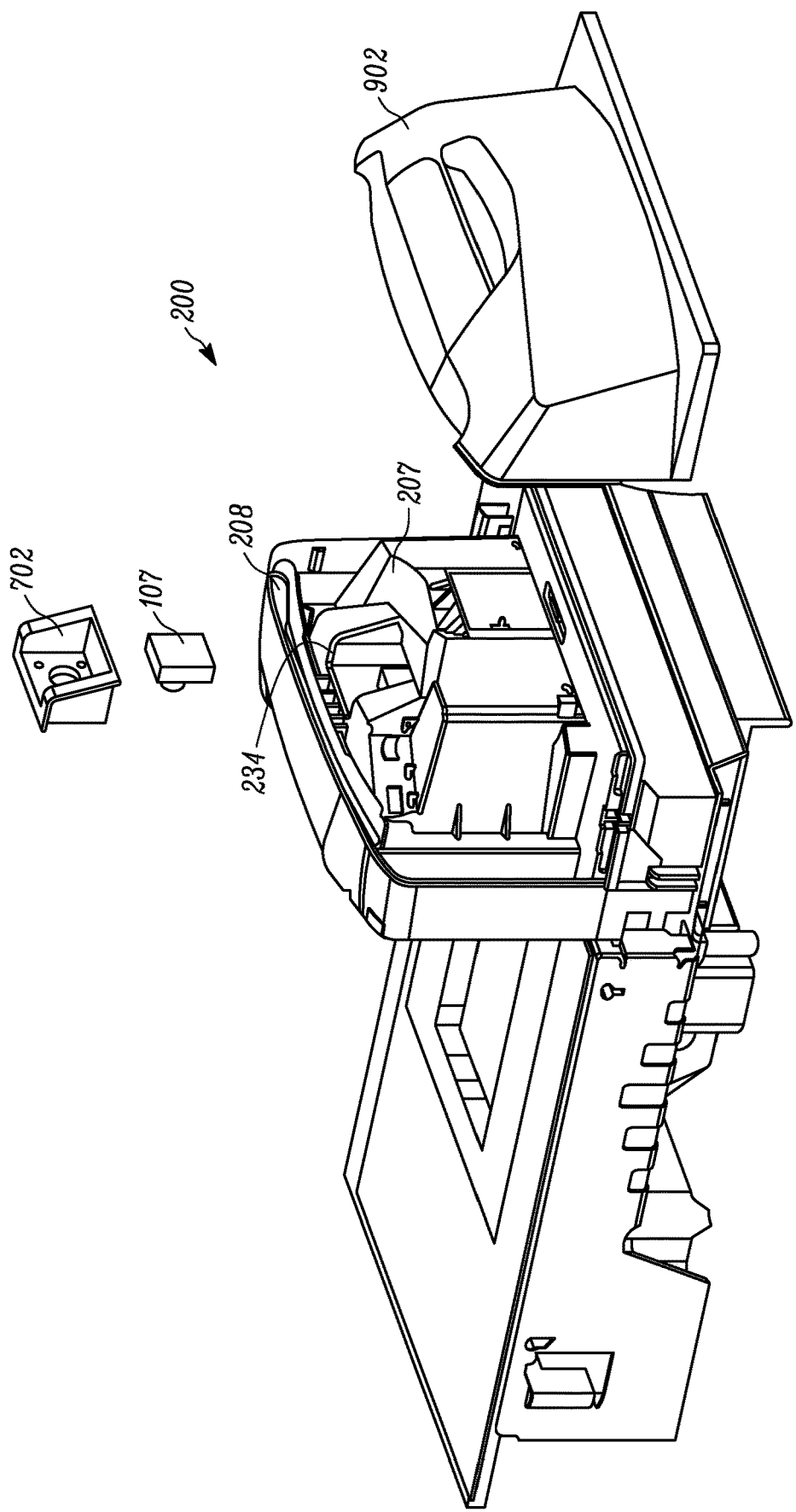
FIG. 13 illustrates an expanded rear perspective view of the barcode reader of FIG. 2 including the insert of FIG. 7 that shows the rear cover of the barcode reader detached from the housing portion of the barcode reader.

FIG. 13 illustrates an expanded rear perspective view of the barcode reader 200 illustrating a rear cover 902 detached from the second housing portion 208. FIG. 13 also illustrates the contours of the divider 207 that correspond to contours of the insert 702 to enable the insert 702 to be matingly received by the receptacle 234. When the rear cover 902 is removed from the second portion 208, the insert 702 and the receptacle 234 can be easily accessed to provide the barcode reader 200 with the camera 107, for example.

Figure 14:
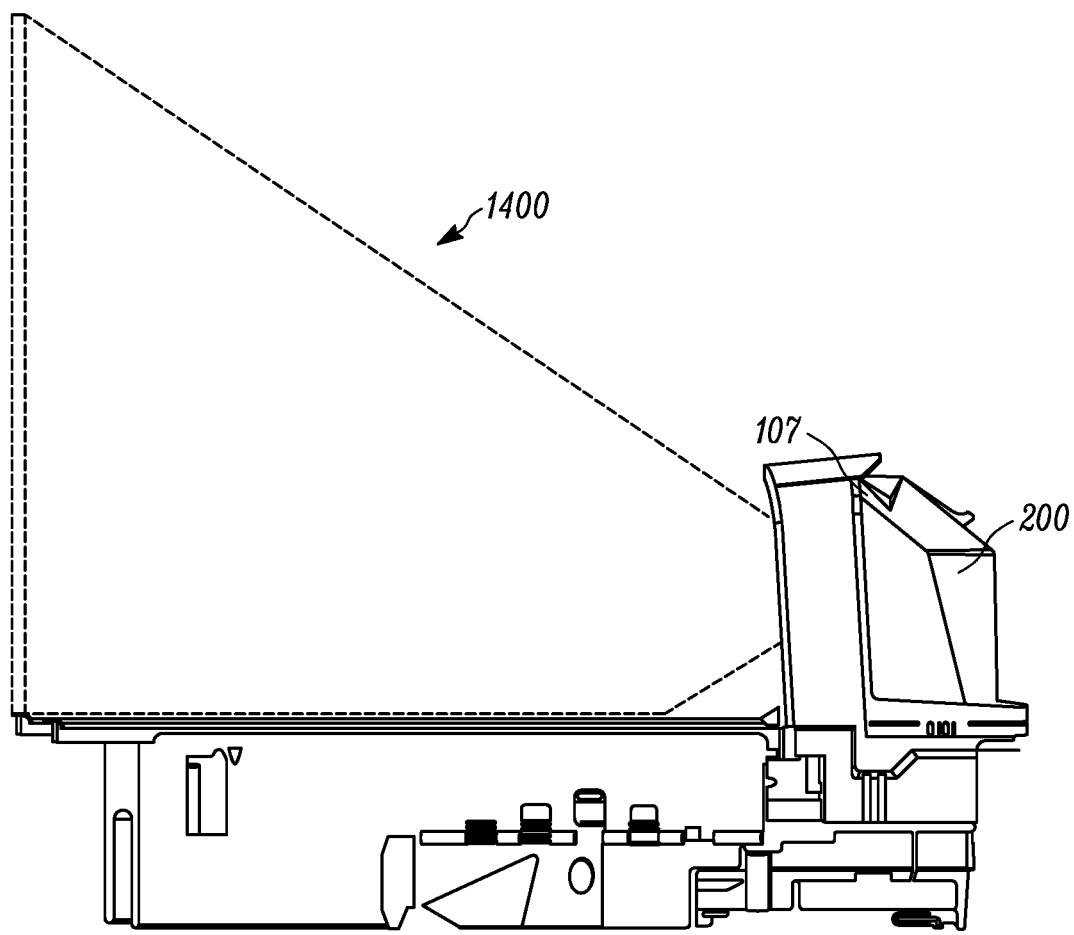
FIG. 14 illustrates an example vertical field of view of the barcode reader of FIG. 2 when the barcode reader is implemented with the insert of FIG. 7.

FIG. 14 illustrates a side view of the barcode reader 200 showing an example vertical field of view 1400 of the camera 107 when the barcode reader 200 is implemented with the insert 702 of FIG. 7. The insert 702 carries the camera 107 in the portrait orientation. As shown, the vertical field of view 1400 is approximately 70°. However, depending on the configuration of the camera 107, the vertical field of view 1400 can be different (e.g., between 45° and 100°).

Figure 15:
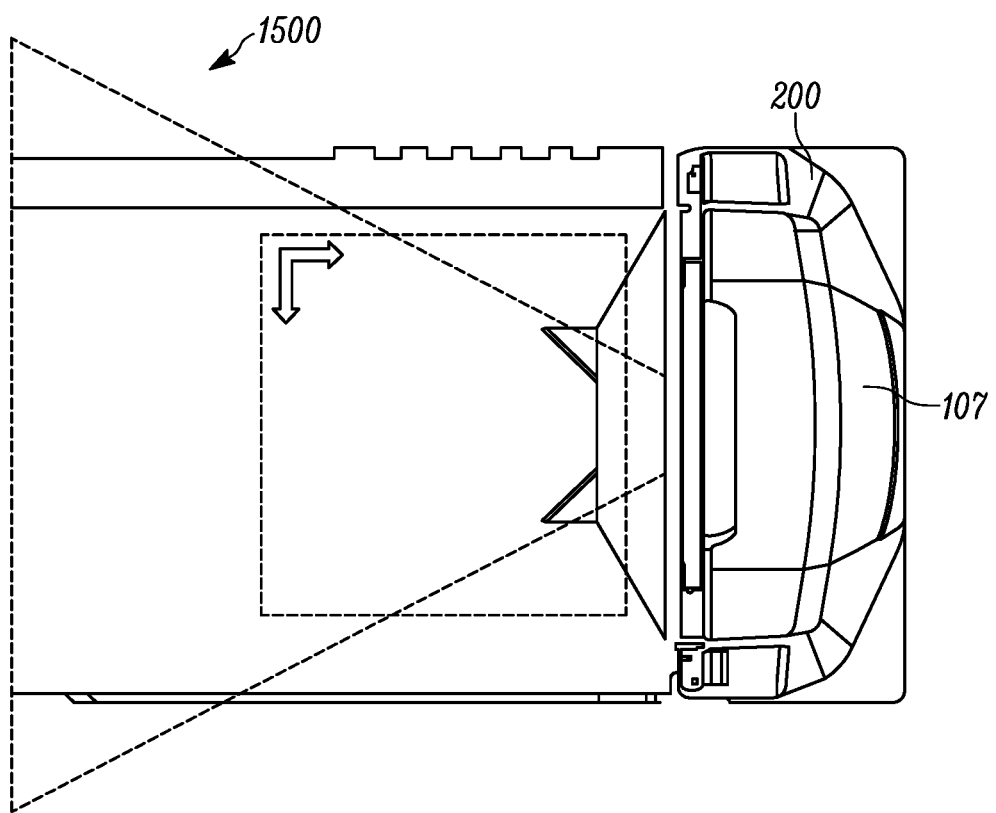
FIG. 15 illustrates an example horizontal field of view of the barcode reader of FIG. 2 when the barcode reader is implemented with the insert of FIG. 7.

FIG. 15 illustrates a top plan view of the barcode reader 200 showing an example horizontal field of view 1500 of the camera 107 when the barcode reader 200 is implemented with the insert 702. The insert 702 carries the camera 107 in the portrait orientation. As shown, the horizontal field of view 1500 is approximately 53°. However, depending on the configuration of the camera 107, the horizontal field of view 1500 can be different (e.g., between 45° and 100°).

From the foregoing, it will be appreciated that the above disclosed apparatus, methods and articles of manufacture enable barcode readers to be field upgraded with cameras using example inserts. The inserts may be referred to as adapters. The inserts are structured to hold the cameras in a desired orientation. For example, the insert may hold the camera in a landscape orientation or a portrait orientation or any other desired position. Put another way, the example bar code readers include means for enabling a change of an orientation of a camera between a first orientation and a second orientation, where the means includes a receptacle that is configured to alternatively receive one of a first field-installable insert or a second field-installable insert. The camera carried by the field-installable inserts is structured to obtain non-barcode data.

In the foregoing specification, specific embodiments have been described. However, one of ordinary skill in the art appreciates that various modifications and changes can be made without departing from the scope of the claims. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A field-upgradeable barcode reader configured to be supported by a workstation, the field-upgradeable barcode reader comprising:
a first housing portion supporting a generally horizontal platter having a generally horizontal window;
a second housing portion supporting a generally vertical window; and
wherein the second housing includes a receptacle configured to alternatively receive one of a cover and a field-installable imaging assembly insert, the field-installable imaging assembly insert configured to receive an image acquisition assembly having a field of view directed over the generally horizontal platter.

2. The field-upgradeable barcode reader of claim 1, further including an image capture arrangement having a first set of optical components and a second set of optical components.

3. The field-upgradeable barcode reader of claim 2, wherein the first set of optical components are positioned at least partially within the first housing portion, the first set of optical components are configured to produce and direct a first field of view (FOV) through the generally horizontal window, the second set of optical components including a first fold mirror and a second fold mirror, the first fold mirror and the second fold mirror being positioned at least partially within the second housing portion, the second set of optical components configured to produce and direct a second FOV and a third FOV through the generally vertical window such that the first fold mirror redirects the second FOV through the generally vertical window and the second fold mirror redirects the third FOV through the generally vertical window.

4. The field-upgradeable barcode reader of claim 3, wherein the receptacle is positioned between the first fold mirror and the second fold mirror.

5. The field-upgradeable barcode reader of claim 1, further including a second cover removably attached to the second housing portion via a fastener.

6. The field-upgradable barcode reader of claim 5, further including a release to uncouple the second cover from the second housing portion.

7. The field-upgradable barcode reader of claim 1, wherein the image acquisition assembly is a camera.

8. The field-upgradable barcode reader of claim 1, wherein the field-installable imaging assembly insert is associated with the image acquisition assembly having one of a portrait orientation or a landscape orientation.

9. A barcode reader, comprising:
a housing carrying first and second imager assemblies, the first and second imager assemblies to obtain barcode data, the housing defining a receptacle to removably receive any one of: 1) a cover; 2) a first insert to carry a first camera; or 3) a second insert to carry the first camera or a second camera, the first insert to enable the first camera to be positioned in a first orientation, the second insert to enable the first camera or the second camera to be positioned in a second orientation.

10. The barcode reader of claim 9, wherein the first and second imager assemblies include image sensors and optics that produce and direct fields of view through respective windows of the housing.

11. The barcode reader of claim 9, wherein the barcode reader includes a first window and a second window, the first imager assembly to capture first barcode data of the barcode data through the first window, the second imager assembly to capture second barcode data of the barcode data through the second window.

12. The barcode reader of claim 10, wherein the first window is substantially perpendicular relative to the second window.

13. The barcode reader of claim 10, wherein the first imager assembly includes a first image sensor and first optical components to provide the first image sensor with a first field of view through the first window and the second imager assembly includes a second image sensor and second optical components to provide the second image sensor with a second field of view and a third field of view through the second window.

14. The barcode reader of claim 13, wherein the housing includes a tower including the second window.

15. The barcode reader of claim 14, wherein the tower includes a divider to define a cavity in which the second optical components are at least partially disposed, the divider defining the receptacle.

16. The barcode reader of claim 15, wherein the divider includes contours that correspond to contours of anyone of the cover, the first insert, or the second insert.

17. The barcode reader of claim 16, wherein the second optical components include a first fold mirror and a second fold mirror, the receptacle disposed between the first and second fold mirrors, the first fold mirror to direct the second field of view through the second window, the second fold mirror to direct the third field of view through the second window.

18. The barcode reader of claim 14, further including a second cover to be removably coupled to the tower, when the second cover is coupled to the tower, the second cover covers the receptacle.

19. The barcode reader of claim 18, further including a release to enable the second cover to be uncoupled from the tower.

20. The barcode reader of claim 19, wherein the first orientation is a portrait orientation and the second orientation is a landscape orientation.

21. The barcode reader of claim 20, wherein the portrait orientation enables a first horizontal field of view of approximately 53 degrees and a first vertical field of view of approximately 70 degrees and the landscape orientation enables a second horizontal field of view of approximately 70 degrees and a second vertical field of view of approximately 53 degrees.

22. A barcode reader, comprising:
    a housing carrying first and second imager assemblies to obtain barcode data captured from a product-scanning region;
    a camera to be disposed in the housing, the camera being different from the first and second imager assemblies; and
    an assembly configured to enable an orientation of the camera to change between a first orientation and a second orientation, the first orientation being a portrait orientation directed at the product-scanning region and the second orientation being a landscape orientation directed at the product-scanning region.

23. The barcode reader of claim 22, wherein the assembly includes a receptacle of the housing that is configured to alternatively receive one of a first field-installable insert or a second field-installable insert, the first field-installable insert to carry the camera when the first field-installable insert is received by the receptacle, the second field-installable insert to carry the camera when the second field-installable insert is received by the receptacle.

* * * * *